United States Patent
Li et al.

(10) Patent No.: US 12,074,824 B2
(45) Date of Patent: Aug. 27, 2024

(54) UPLINK CONTROL INFORMATION MULTIPLEXING ON PHYSICAL UPLINK CONTROL CHANNEL

(71) Applicant: QUALCOMM Incorporated, San Diego, CA (US)

(72) Inventors: Qiaoyu Li, Beijing (CN); Yu Zhang, Beijing (CN); Chenxi Hao, Beijing (CN); Liangming Wu, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 17/275,597

(22) PCT Filed: Sep. 21, 2018

(86) PCT No.: PCT/CN2018/106960
§ 371 (c)(1),
(2) Date: Mar. 11, 2021

(87) PCT Pub. No.: WO2020/056726
PCT Pub. Date: Mar. 26, 2020

(65) Prior Publication Data
US 2022/0103330 A1  Mar. 31, 2022

(51) Int. Cl.
*H04L 5/00* (2006.01)
*H04L 1/1607* (2023.01)
*H04L 1/1812* (2023.01)

(52) U.S. Cl.
CPC .......... *H04L 5/0055* (2013.01); *H04L 1/1671* (2013.01); *H04L 1/1812* (2013.01)

(58) Field of Classification Search
None
See application file for complete search history.

(56) References Cited

U.S. PATENT DOCUMENTS

2013/0343238 A1   12/2013   Seo et al.
2014/0036704 A1    2/2014   Han et al.
(Continued)

FOREIGN PATENT DOCUMENTS

CN   101908950 A   12/2010
CN   102148655 A    8/2011
(Continued)

OTHER PUBLICATIONS

Author Unknown, Considerations on DL multi-panel and multi-TRP transmission, Doc No. R1-1715798, pp. 1-4, Sep. 21, 2017.*
(Continued)

*Primary Examiner* — Christopher M Crutchfield
(74) *Attorney, Agent, or Firm* — QUALCOMM Incorporated

(57) ABSTRACT

Certain aspects of the present disclosure provide techniques for multiplexing uplink control information (UCI) on physical uplink control channel (PUCCH) resources for non-ideal backhaul based multi-transmission/reception point non-coherent joint transmissions. An example method generally includes determining that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with downlink demodulation reference signal (DMRS) port groups, generating CSI reports and HARQ feedback associated with at least one of the downlink DMRS port groups, and transmitting the CSI reports and the HARQ feedback, multiplexed using the second set of PUCCH resources.

46 Claims, 12 Drawing Sheets

(56) References Cited

U.S. PATENT DOCUMENTS

| | | | |
|---|---|---|---|
| 2017/0006491 | A1 | 1/2017 | Chen et al. |
| 2017/0208568 | A1* | 7/2017 | Nam ..................... H04W 72/23 |
| 2018/0227103 | A1 | 8/2018 | Wang et al. |
| 2019/0364561 | A1* | 11/2019 | Xiong .................. H04W 76/27 |
| 2020/0021411 | A1* | 1/2020 | Ren ..................... H04L 41/0806 |
| 2021/0321432 | A1* | 10/2021 | Yoshimura ............ H04L 1/1861 |

FOREIGN PATENT DOCUMENTS

| | | |
|---|---|---|
| CN | 102281133 A | 12/2011 |
| CN | 103210604 A | 7/2013 |
| EP | 2582082 A1 | 4/2013 |

OTHER PUBLICATIONS

Author Unknown, Solution and TP for multi-TRP PDCCH transmission, Doc. No. R1-1800824, pp. 1-5, Jan. 26, 2018.*
Author Unknown, On DMRS groups in Rel-15, Doc. No. R1-1806222, pp. 1-2, May 25, 2018.*
Author Unknown, Correction on PUCCH and UCI multiplexing for NR, Doc. No. R1-1808491, pp. 1-7, Aug. 20, 2018.*
Author Unknown, Enhancements on Multi-TRP/panel transmission in NR, Doc. No. R1-1809117, pp. 1-10, Aug. 20, 2018.*
International Search Report and Written Opinion—PCT/CN2018/106960—ISA/EPO—Jun. 20, 2019.
Bell A.L.S., et al., "Multiple CSI Reports on PUCCH for DL COMP", 3GPP Draft, 3GPP TSG RAN WG1 Meeting #69, R1-122888, 3rd Generation Partnership Project (3GPP), Mobile Competence Centre, 650, Route Des Lucioles, F-06921 Sophia-Antipolis Cedex, France, vol. RAN WG1, No. Prague, Czech Republic, May 21, 2012-May 25, 2012, May 25, 2012 (May 25, 2012), XP050601169, 6 Pages, [Retrieved on May 25, 2012] The Whole Document.
Supplementary European Search Report—EP18934038—Search Authority—The Hague—Mar. 25, 2022.

* cited by examiner

UPLINK CONTROL INFORMATION MULTIPLEXING ON PHYSICAL UPLINK CONTROL CHANNEL

CROSS-REFERENCE TO RELATED APPLICATION

This application is a national stage application under 35 U.S.C. 371 of PCT/CN2018/106960, filed Sep. 21, 2018, which is incorporated by reference herein in its entirety for all applicable purposes.

FIELD OF THE DISCLOSURE

Aspects of the present disclosure relate to wireless communications, and more particularly, to techniques for multiplexing uplink control information (UCI) on physical uplink control channel (PUCCH) resources for non-ideal backhaul based multi-tramsmission/reception point non-coherent joint transmissions.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple com.munication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit,may define an access node (e.g., which may be referred to as a base station, 5G NB, next generation NodeB (gNB or gNodeB), TRP, etc.). A base station or distributed unit may communicate with a set of UEs on downlirik channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband. Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations and user equipment in a wireless network.

Certain aspects provide a method for wireless communication by a user equipment (UE). The method generally includes determining that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with downlink demodulation reference signal (DMRS) port groups, generating CSI reports and HARQ feedback associated with at least one of the downlink DMRS port groups, and transmitting the CSI reports and the HARQ feedback, multiplexed using the second set of PUCCH resources.

Certain aspects provide a method for wireless communication by a base station (BS). The method generally includes generating a configuration of a first set of physical uplink control channel (PUCCH) resources for reporting channel state information (CSI), transmitting the configuration to at least one user equipment (UE), generating an indication of a second set of PUCCH resources for reporting hybrid automatic repeat request (HARQ) feedback, wherein the first set of PUCCH resources configured for reporting CST overlaps with the second set of PUCCH resources indicated for reporting HARQ feedback, wherein the first and second sets of PUCCH resources are associated with downlink demodulation reference signal (DMRS) port groups, transmitting the indication to the at least one UE, and receiving, from the at least one UE, uplink control information (UCI), comprising CSI reports and HARQ feedback, multiplexed using the second set of PUCCH resources.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG, 11A is a diagram of an example multi-TRP wireless communication network where each portion of the. PUCCH resources scheduled for HARQ feedback overlaps with PUCCH resources configured for CSI reporting and target the same TRP, in accordance with certain aspects of the present disclosure.

Figure 11A:
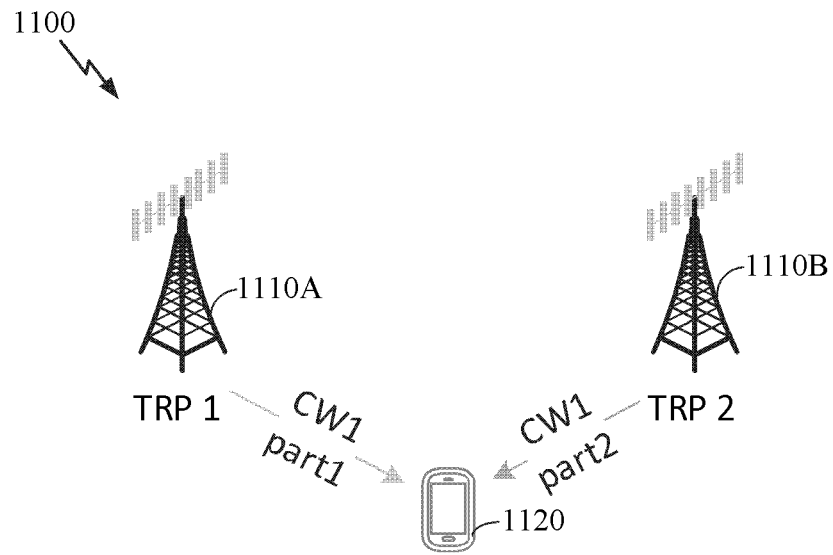
Figure 11B:
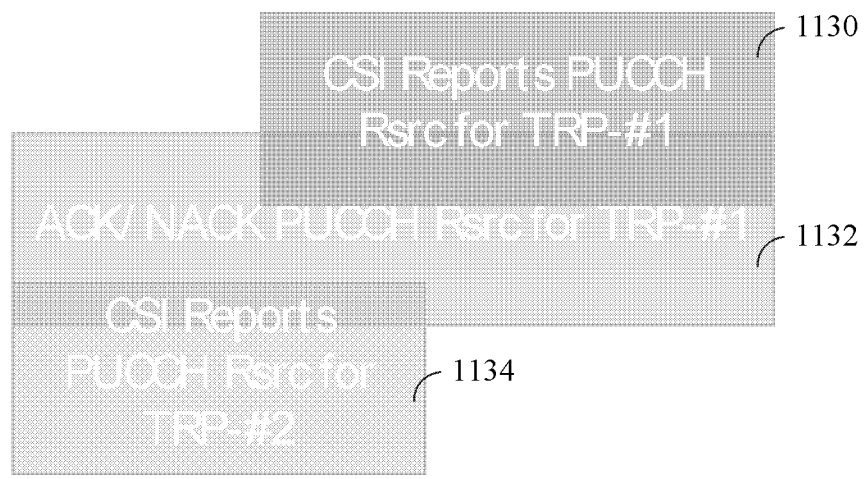

FIG. 11B is a diagram of example PUCCH resources configured for reporting CSI and HARQ feedback for the UE of FIG. 11A, in accordance with certain aspects of the present disclosure.

Figure 12:
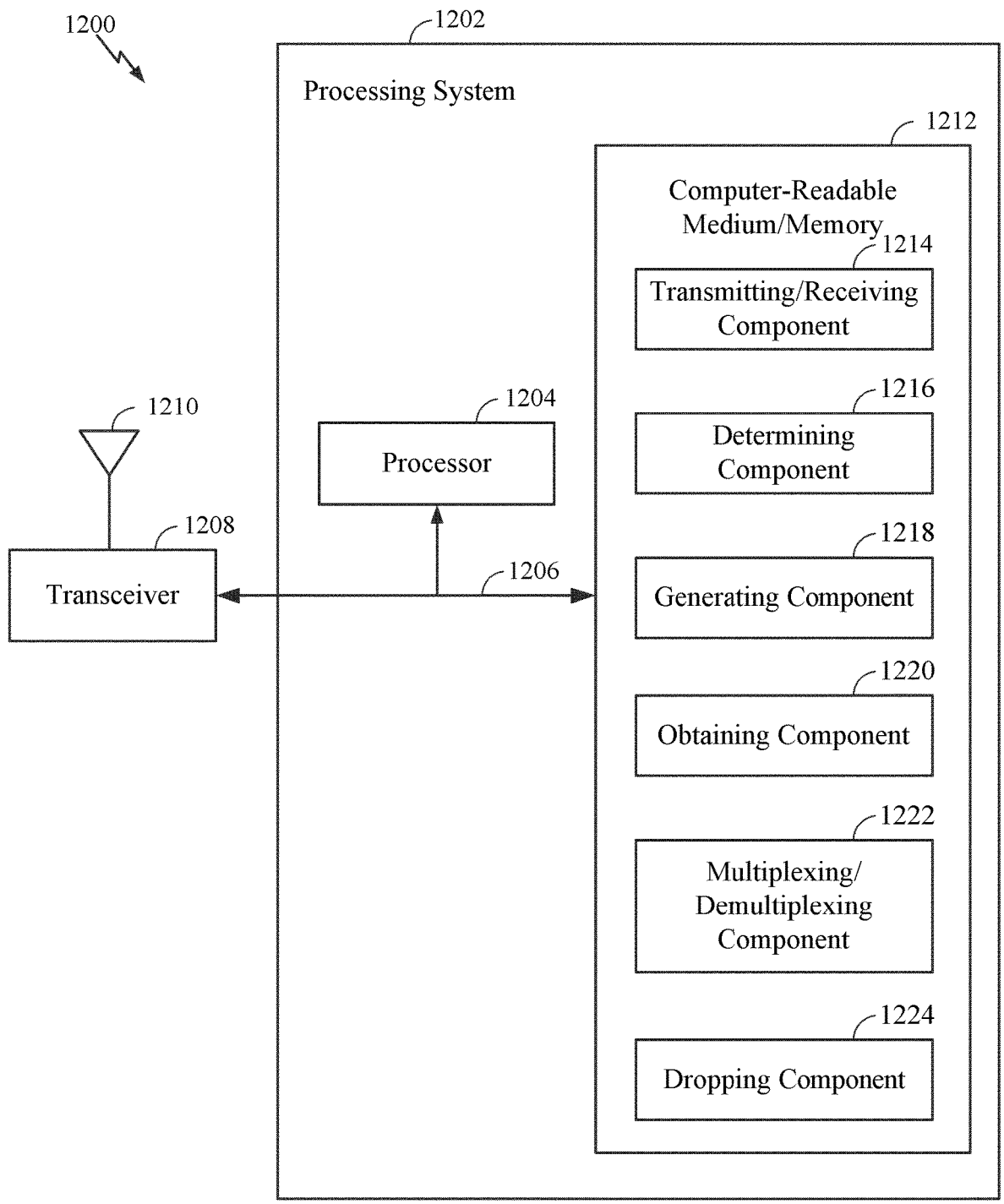

FIG. 12 illustrates a communications device that may include various components configured to perform operations for the techniques disclosed herein in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for multiplexing UCI on PUCCH resources for non-ideal backhaul based multi-transmissiontreception point non-coherent joint transmissions.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IIS-95 and IS-856 standards. A TDMA network may implement a radio technology such as Global System for Mobile Communications (GSM), An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA, are part of Universal Mobile Telecommunication System (UMTS).

New Radio (NR) is an emerging wireless conirnunications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e,g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

Figure 1:
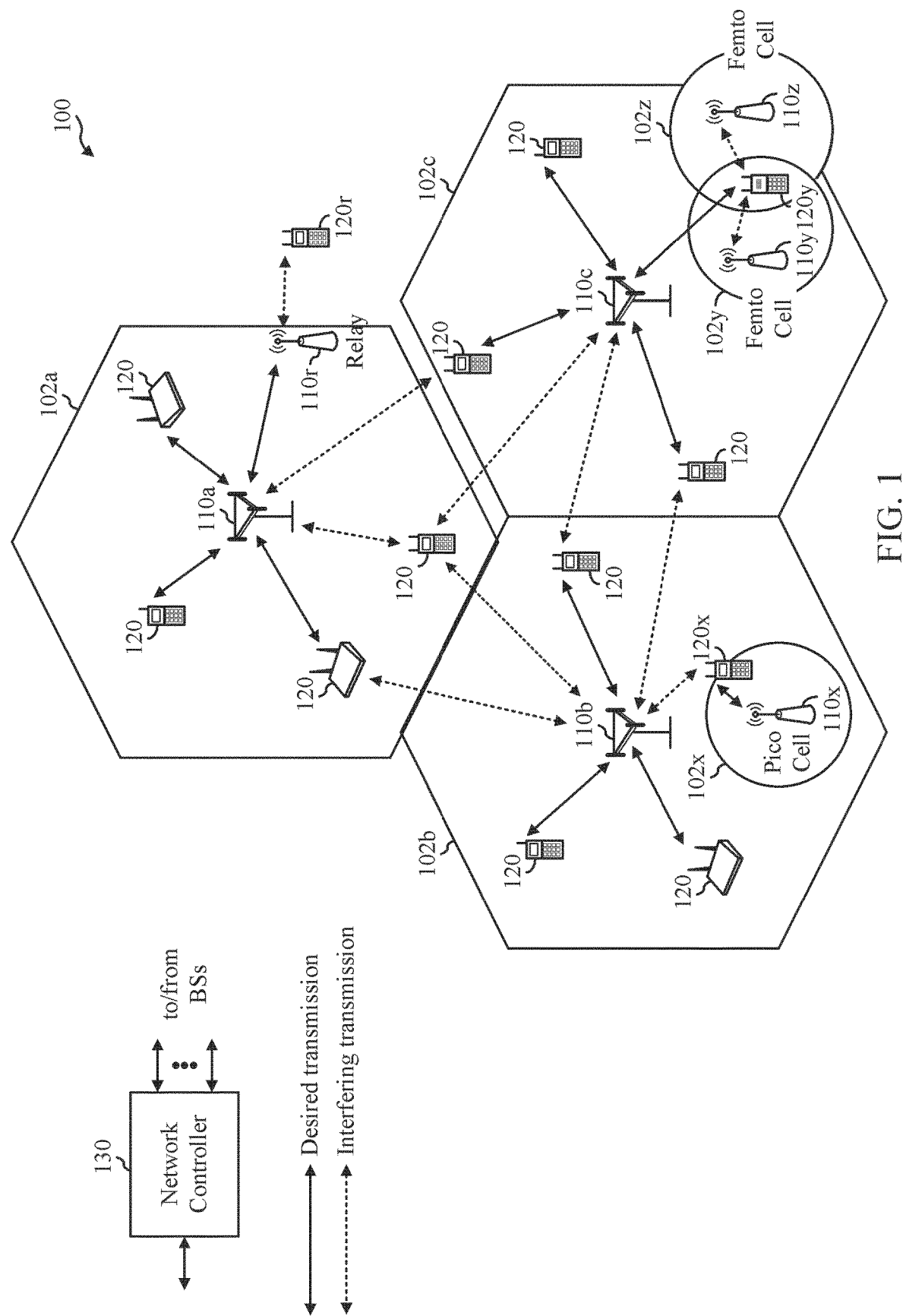
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be a New Radio (NR) or 5G network that enables multiplexing uplink control information (LCI) on physical uplink control channel (PUCCH) resources for non-ideal wireless backhaul based multi-transmission/reception point non-coherent joint transmissions.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in ler geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by liEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a. smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband. IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MAIO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
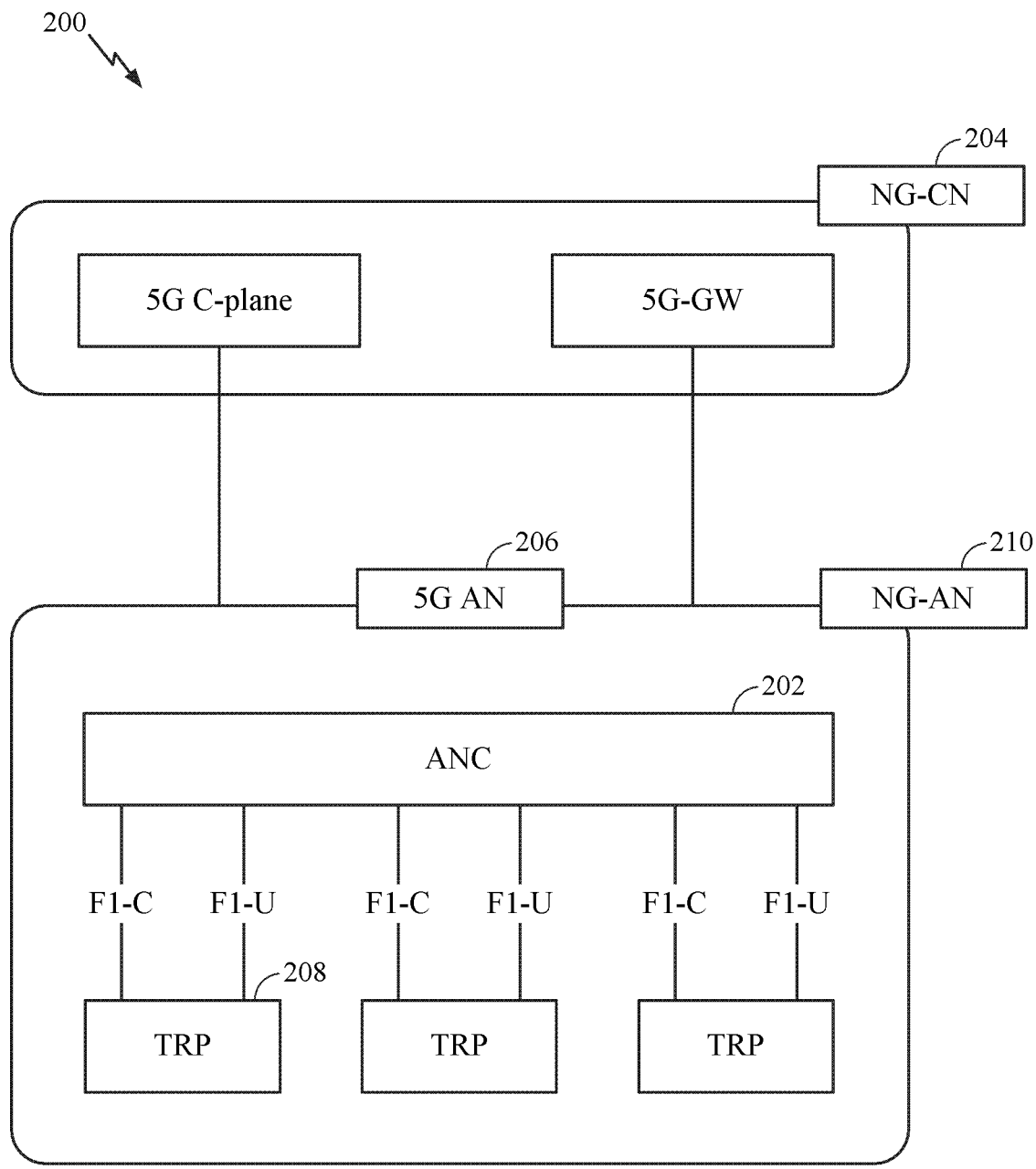
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gN s, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with UTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
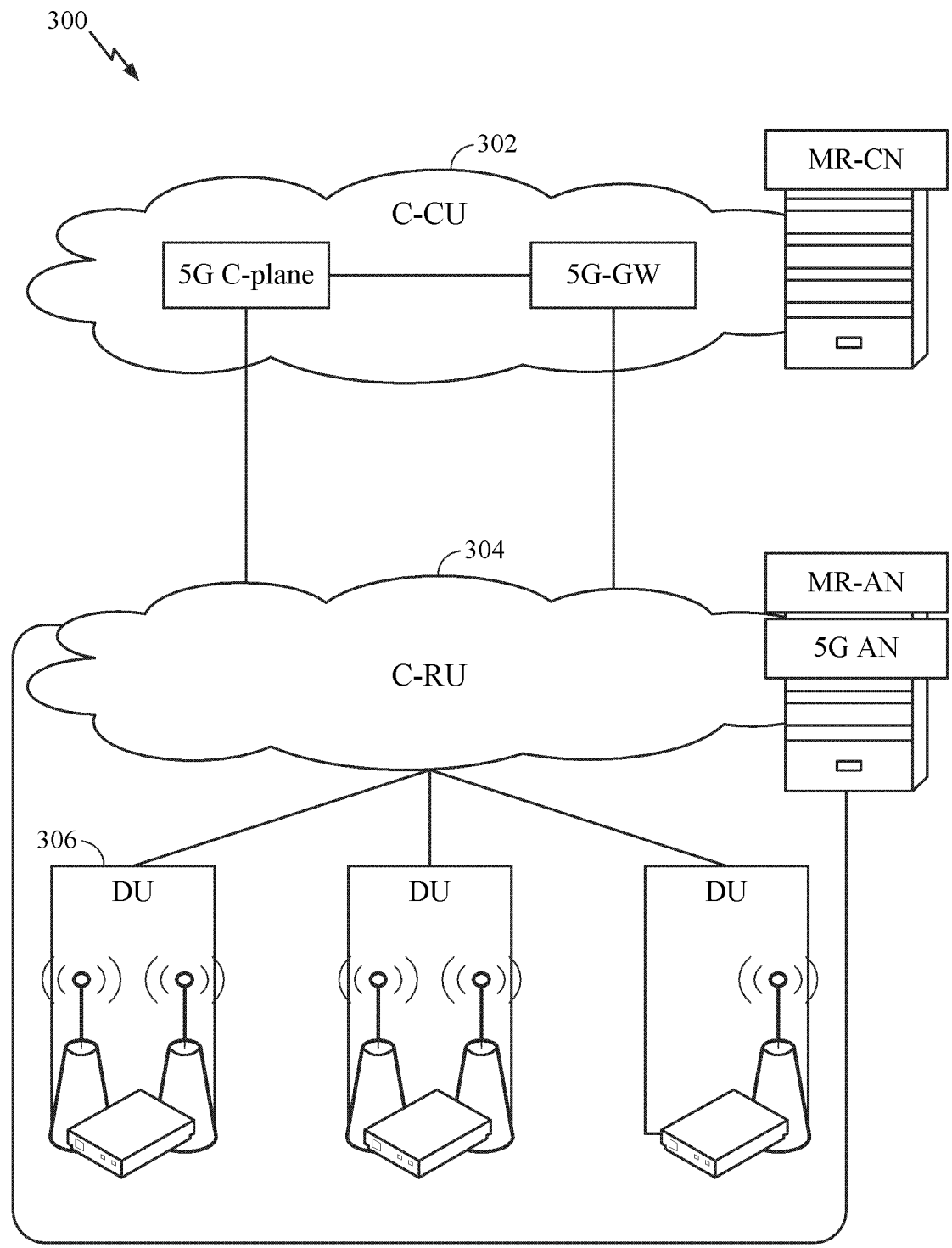
FIG. 3 is a diagram illustrating an example physical architecture of a. distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g,, to advanced wireless services (AWS)), in an effort to handle peak capacity.

A centralized. RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
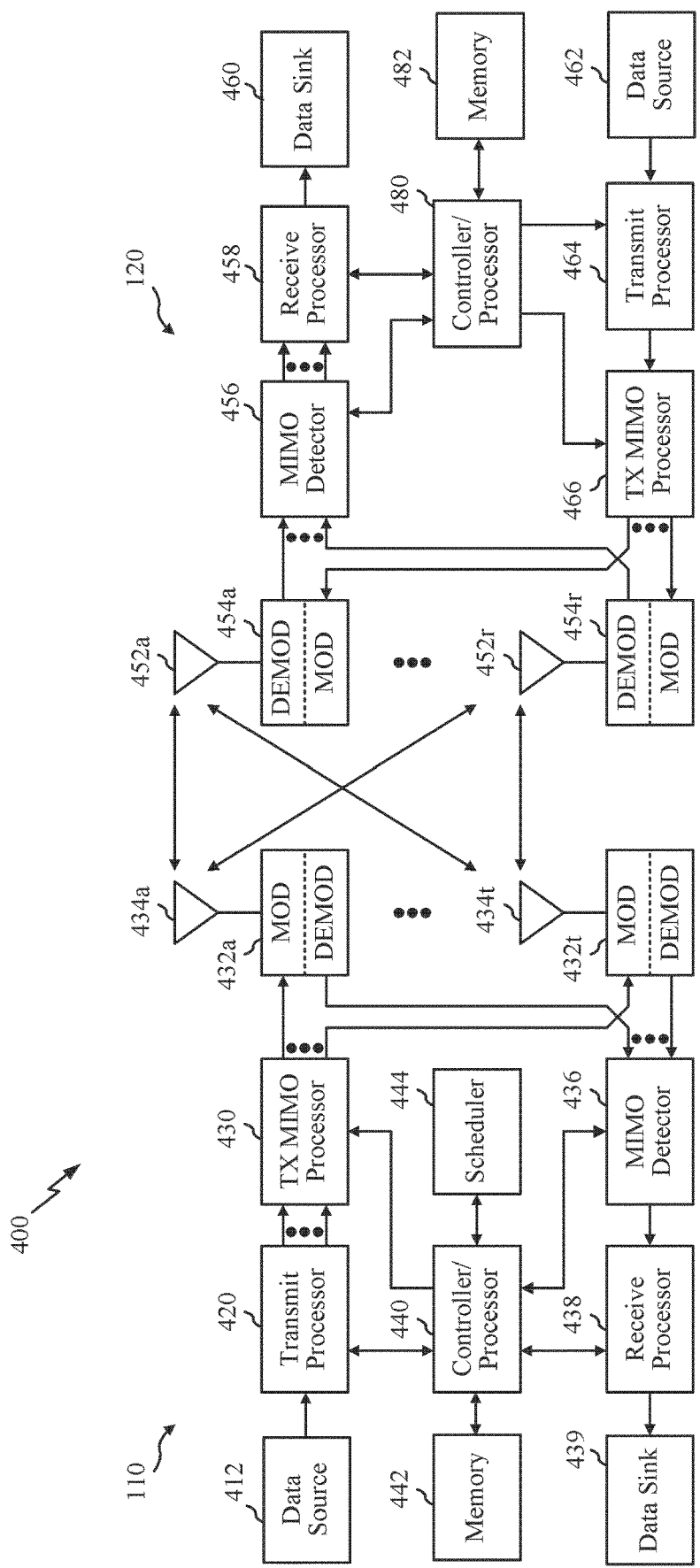
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, such as the operations illustrated in FIGS. 7 and 8, or other aspects of the operations described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODS) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
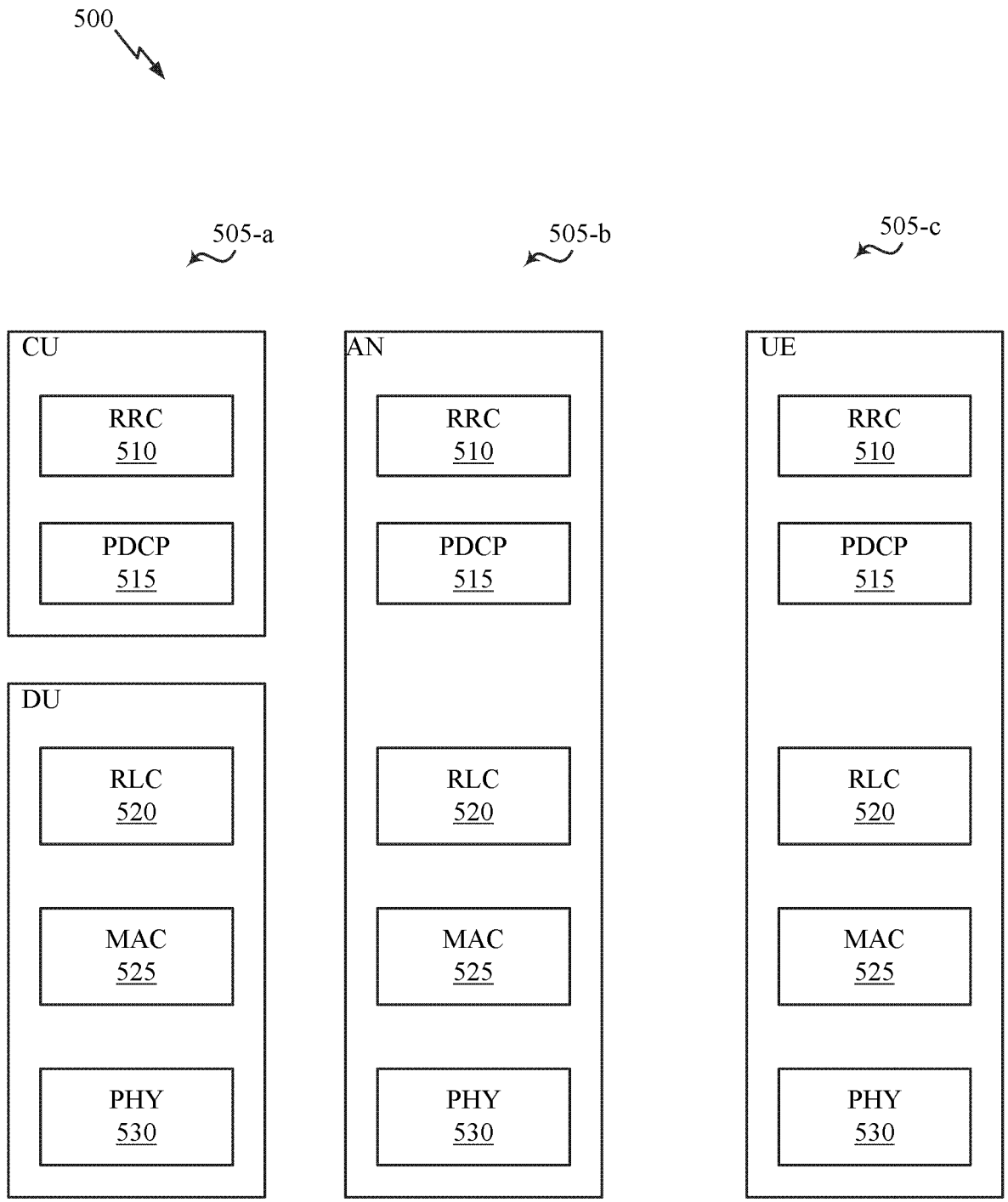
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data. Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
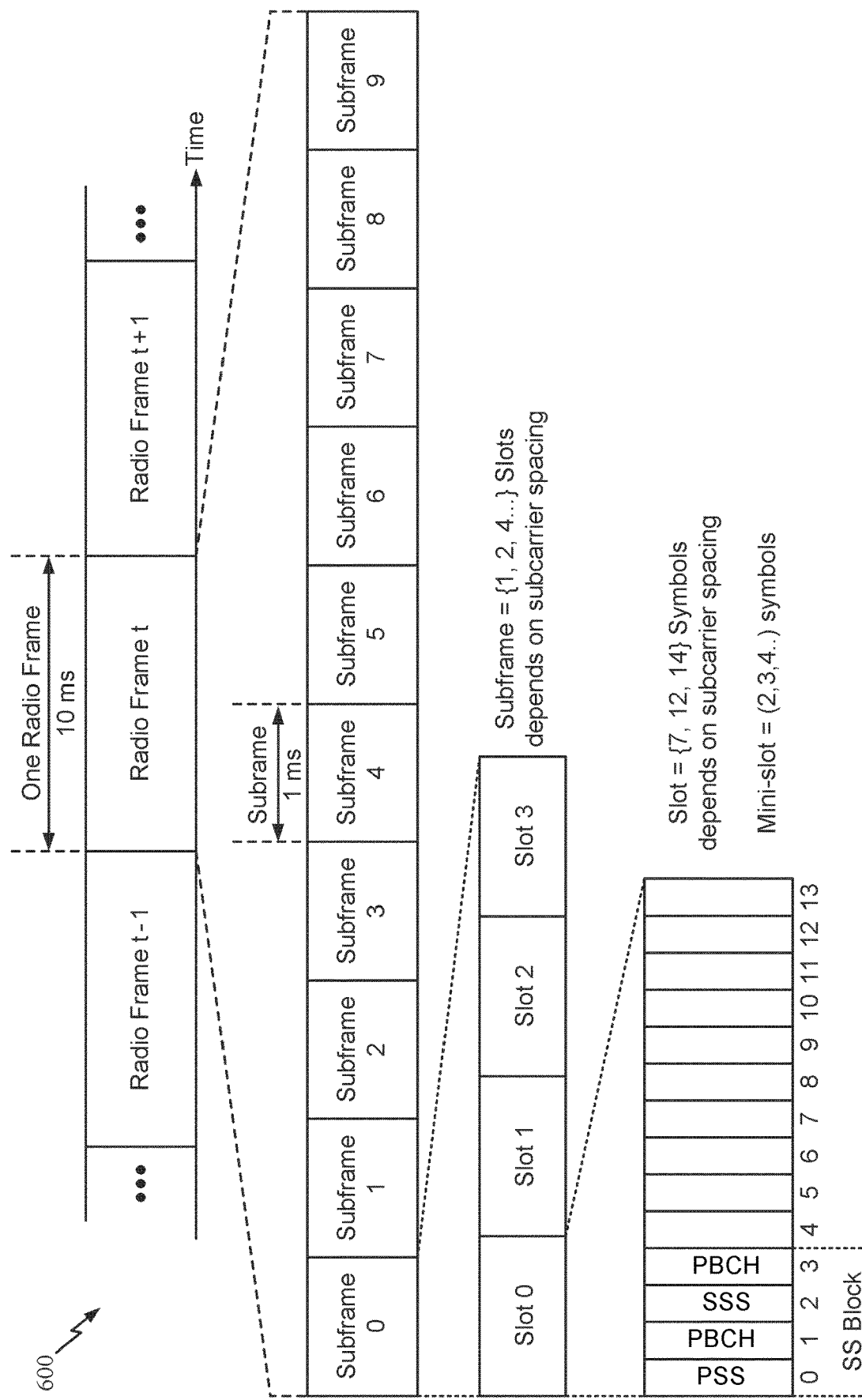
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBS), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Uplink Control Information Multiplexing
On Physical Uplink Control Channel In certain wireless communication networks (e.g., 5G NR wireless networks), hybrid automatic repeat request (HARQ) feedback (e.g., HARQ acknowledgement (ACK) or negative acknowledgement (NACK) messages) may be scheduled using a single PUCCH resource as indicated in the last received downlink control signaling message(s) (e.g., a DCI message). For instance, a UE may be configured via radio resource control signaling (e.g., RRC messages) with PUCCH resource sets, which may be arranged in ascending order with respect to payload size. The UE may determine the PUCCH resource set to use for certain uplink control information (UCI) based on the UCI payload size. The RAN may indicate to the UE a single PUCCH resource index, configured for HARQ feedback, via the PDSCH associated downlink control signaling (e.g., DCI messages).

With the single PUCCH resource, the UE cannot avoid overlapping the resource between scheduled HARQ feedback and channel state information (CSI) reports. The CSI reports may be multiplexed onto the PUCCH resource scheduled for HARQ feedback. In multi-TRP non-coherent joint transmission applications, the single PUCCH resource configured for HARQ feedback may delay channel state information (CSI) reporting for one of the TRPs due to a non-ideal wireless backhaul (e.g., a delay greater than 10 ms) contributing to performance losses between the UE and another one of the TRPs. The single PUCCH resource configured for HARQ feedback may be unable to support multiple PUCCH resources-based CSI feedback. To reduce or eliminate the delay, the UE may be scheduled to use multiple PUCCH resources for multi-TRP HARQ feedback and CSI reports.

Aspects of the present disclosure provide various techniques for multiplexing the CSI reports on the PUCCH resources scheduled for multi-TRP HARQ feedback, when the PUCCH resources configured for HARQ feedback and CSI reports overlap. For instance, the UE may multiplex TRP-specific CSI reports and TRP-specific HARQ feedback over TRP-specific PUCCH resources. The multiplexing of the CSI reports may include dropping CSI reports according to the payload size of the PUCCI-I resources scheduled for HARQ feedback.

Figure 7:
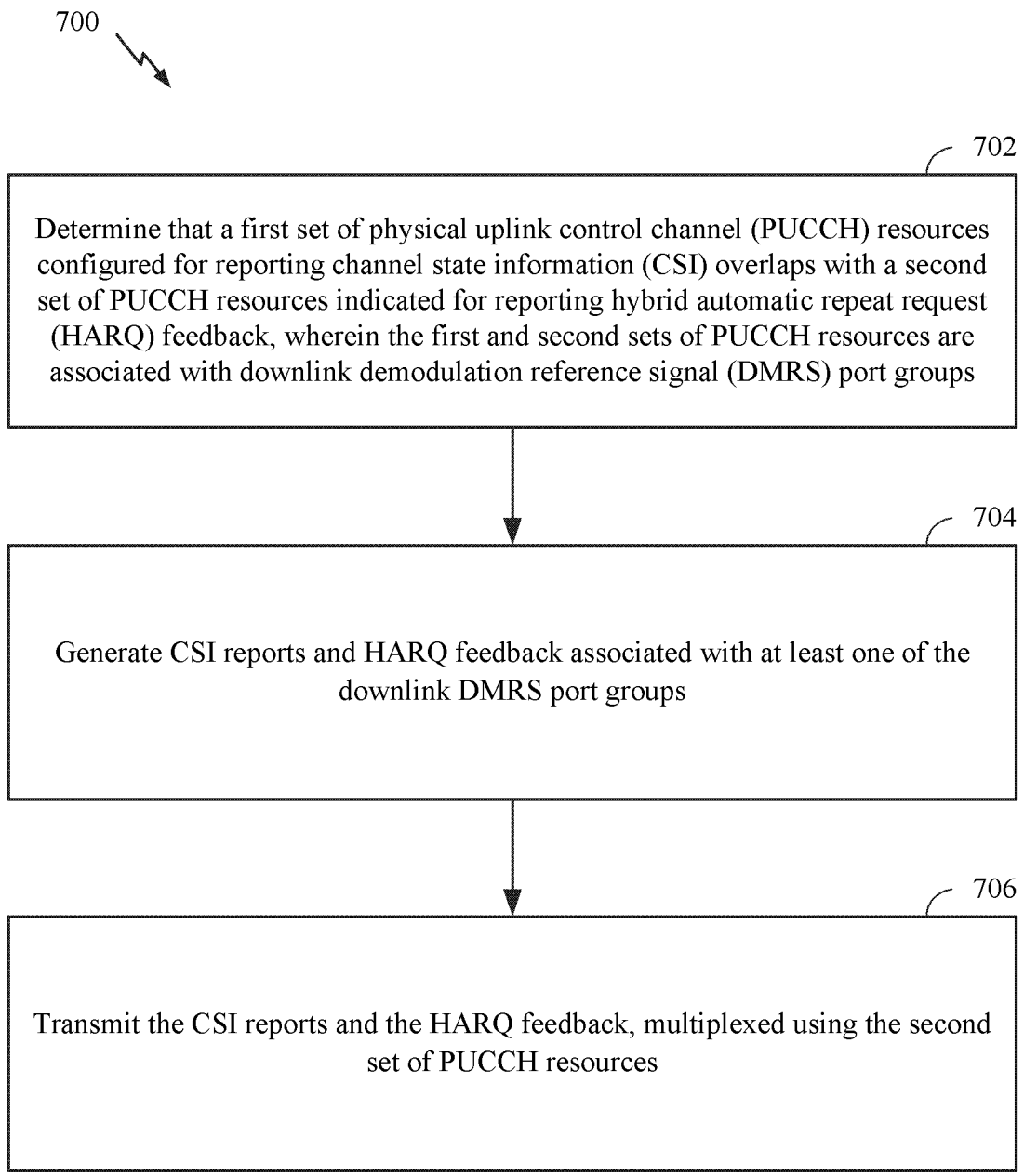
FIG. 7 is a flow diagram illustrating example operations for transmitting multiplexed uplink control information, in accordance with certain aspects of the present disclosure.

FIG. 7 is a flow diagram illustrating example operations 700 that may be performed, for example, by a user equipment (e.g., UE 120), for transmitting multiplexed uplink control information, in accordance with certain aspects of the present disclosure.

Operations 700 may begin, at 702, where the UE determines that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with downlink demodulation reference signal (DMRS) port groups. At 704, the UE generates CSI reports and HARQ feedback associated with at least one of the downlink DMRS port groups. At 706, the UE transmits the CSI reports and the HARQ feedback, multiplexed using the second set of PUCCH resources.

Figure 8:
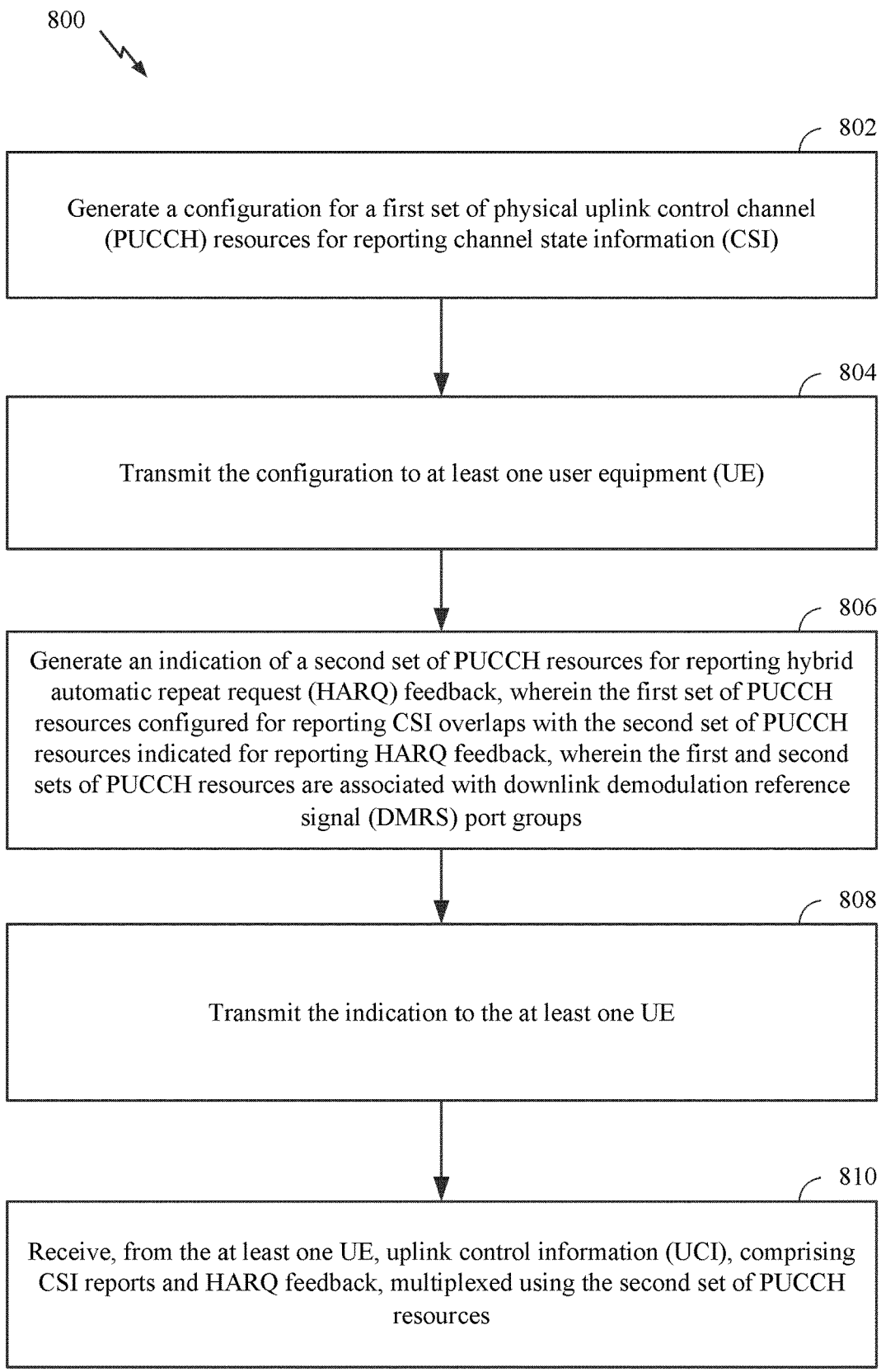
FIG. 8 is a flow diagram illustrating example operations for configuring overlapping PUCCH resources for CSI reports and HARQ feedback, in accordance with certain aspects of the present disclosure.

FIG. 8 is a flow diagram illustrating example operations 800 that may be performed, for example, by a base station (e.g., BS 110), for configuring overlapping PUCCH resources for CSI reports and HARQ feedback, in accordance with certain aspects of the present disclosure.

Operations 800 may begin, at 802, where the BS generates a configuration for a first set of physical uplink control channel (PUCCH) resources for reporting channel state information (CSI). At 804, the BS transmits the configuration to at least one user equipment (UE). At 806, the BS generates an indication of a second set of PUCCH resources for reporting hybrid automatic repeat request (HARQ) feedback, wherein the first set of PUCCH resources configured for reporting CSI overlaps with the second set of PUCCH resources indicated for reporting HARQ feedback, wherein the first and second sets of PUCCH resources are associated with downlink demodulation reference signal (DMRS) port groups. At 808, the BS transmits the indication to the at least one UE. At 810, the BS receives, from the at least one UE, uplink control information (UCI), comprising at least one CSI report and HARQ feedback, multiplexed using the second set of PUCCH resources.

As used herein, a PUCCH resource associated with one or more downlink demodulation reference signal (DMRS) port groups refers to a PUCCH resource being configured for UCI transmissions (e.g., HARQ feedback and/or CSI reporting) targeting multiple TRPs. For example, a UE may receive downlink DMRSs from multiple TRPs using DMRS port groups (e.g., multiple antenna port groups). Each of the DMRS port groups may be assigned to a different TRP and used for non-coherent joint transmissions. The UE may report UCI (e.g., HARQ feedback and/or CSI reporting) to multiple TRPs, simultaneously, associated with the different DMRS port groups by multiplexing the CSI reports over PUCCH resources scheduled for HARQ feedback as further described herein.

In accordance with certain aspects, where the same TRPs are targeted for reporting the CSI reports and the HARQ feedback via overlapping PUCCH resources, the UE may apply various multiplexing rules for the CSI reports the HARQ feedback. For CSI reports targeting a TRP, which has RRC configured PUCCH resource overlapped with a PUCCH resource for HARQ feedback targeting the same TRP, the UE may multiplex the corresponding CSI reports with the HARQ feedback targeting the same TRP and transmit the combined. UCI using the PUCCH resources scheduled via downlink control signaling (e.g., DCI messages) for the HARQ feedback. The PUCCH resources associated with the HARQ feedback used to multiplex the CSI reports may include any of the PUCCH resources configured for HARQ feedback targeting the same TRP as the CSI reports, such as PUCCH resources for reporting HARQ feedback that overlap or do not overlap with the PUCCH resources for reporting CSI.

For instance, the UE may determine that each portion of the first set of PUCCH resources configured for reporting CSI is associated with a same downlink DMRS port group as an overlapping portion of the second set of PUCCH resources configured for reporting HARQ feedback. A portion of a set of PUCCH resources may include one or more frequency-time resources within the set of PUCCH resources, such as one or more resource elements configured as the PUCCH, where a resource element includes one subcarrier during one OFDM symbol. The UE may transmit the CSI reports and the HARQ feedback by multiplexing the CST reports for each portion of the first set of PUCCH resources using the multiplexing portions of the second set of PUCCI resources configured for reporting the HARQ feedback. In certain aspects, the multiplexing portions of the second set of PUCCH resources may include overlapping portions of the second set of PUCCH resources and at least one determined additional portion of the second set of PUCCH resources associated with the same downlink DMRS port group as the overlapping portion of the second set of PUCCH resources. The at least one additional portion of the second set of PUCCH resources associated may not overlap with the respective portion of the first set of PUCCH resources. If the UE determines that there is an additional portion of the second set of PUCCH resources that does not overlap and targets the same TRP as the overlapping portions, the UE may use the determined additional portion of the second set of PUCCH resources for multiplexing the CSI reports.

For certain aspects, the UE may determine to drop one or more of the CSI reports if some of the CSI reports targeting the same TRP have RRC configured PUCCH resources that conflict with the PUCCH resources scheduled for HARQ feedback. For example, the UE may determine that the payload size of the combined CSI reports and HARQ feedback exceeds the allowed payload size of the PUCCH resources scheduled for HARQ feedback reporting. The UE may multiplex the CSI reports with the HARQ feedback targeting the same TRP based on the priority levels of the CSI reports and transmit the combined UCI using the PUCCH resources scheduled via downlink control signaling (e.g., DCI messages) for the HARQ feedback. Multiplexing the CSI reports based on the priority levels may include selecting the CSI reports with the higher reporting priorities for multiplexing and dropping the CSI reports with the lower reporting priorities. If the CSI reports have the same priority levels, the UE may select the CSI reports for multiplexing based on PUCCH resource index, payload size, or other suitable factors. The CSI reports may be multiplexed within a maximum number of CSI reports. The maximum number of CSI reports to be multiplexed may be based on the allowed payload size of the PUCCH resources scheduled for the HARQ feedback for UCI transmission.

As an example, the UE may transmit the CSI reports and the HARQ feedback by multiplexing the CSI reports for each portion of the first set of PUCCH resources using the portion of the second set of PUCCH resources configured for reporting the HARQ feedback according to a priority level associated with each of the CSI reports.

As another example, suppose the UE is configured to report CSI using a first portion, second portion, and a third portion of a first set of PUCCH resources targeting a certain TRP. The UE is also configured to report HARQ feedback using a second portion, third portion, and a fourth portion of a second set of PUCCH resources targeting the same TRP, and the second and third portions of the first set of PUCCH resources overlap with the second and third portions of the second set of PUCCH resources. The UE may determine that portions of the PUCCH resources configured for CSI reporting and HARQ feedback overlap and target the same TRP. Based on the determination, the UE may multiplex the CSI reports using all of the portions of the second set of PUCCH resources (e.g., the second portion, third portion, and fourth portion of the second set of PUCCH resources) targeting the same TRP as the CSI reports. All portions of the PUCCH resources for HARQ feedback targeting a specific TRP may be used for UCI multiplexing as described herein.

For certain aspects, the BS may be aware of the multiplexing performed at the UE to demultiplex the CSI reports sent via the PUCCH resources configured for HARQ feedback. For instance, the BS may determine that each portion of the first set of PUCCH resources configured for reporting CSI is associated with the same downlink DMRS port group as an overlapping portion of the second set of PUCCH resources configured for reporting HARQ feedback. The BS may receive the UCI by demultiplexing CSI reports for each portion of the first set of PUCCH resources using the multiplexing portions of the second set of PUCCH resources configured for reporting the HARQ feedback. The BS may demultiplex the CSI reports with the HARQ feedback targeting the same TRP based on the priority levels of the CSI reports using the PUCCH resources scheduled via downlink control signaling (e.g., DCI messages) for the HARQ feedback. The BS may assume that higher priority CSI reports are multiplexed with the HARQ feedback and lower priority CSI reports are dropped. Demultiplexing the CSI reports based on the priority levels may include identifying the CSI reports with higher reporting priorities that were multiplexed at the UE and identifying the CSI reports with lower reporting priorities that were not transmitted by the UE.

Figure 9A:
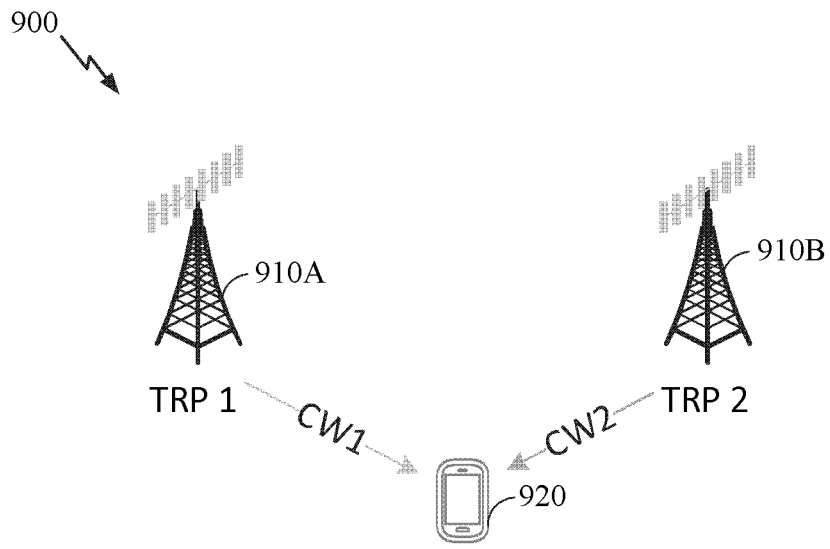
FIG. 9A is a diagram of an example multi-TRP wireless communication network where each portion of the PUCCH resources scheduled for HARQ feedback overlaps with PUCCH resources configured for CSI reporting and target the same TRP, in accordance with certain aspects of the present disclosure.

FIG. 9A illustrates an example multi-TRP wireless communication network 900 where each portion of the PUCCH resources scheduled for HARQ feedback overlaps with PUCCH resources configured for CSI reporting and target the same TRP, in accordance with certain aspects of the present disclosure. As shown, the UE 920 is connected to TRP 910A and TRP 910B and configured to use separate codewords for the HARQ feedback. FI'. 9B is a diagram of example PUCCH resources assigned to the UE 920 and configured for reporting CSI and HARQ feedback, in accordance with certain aspects of the present disclosure.

Figure 9B:
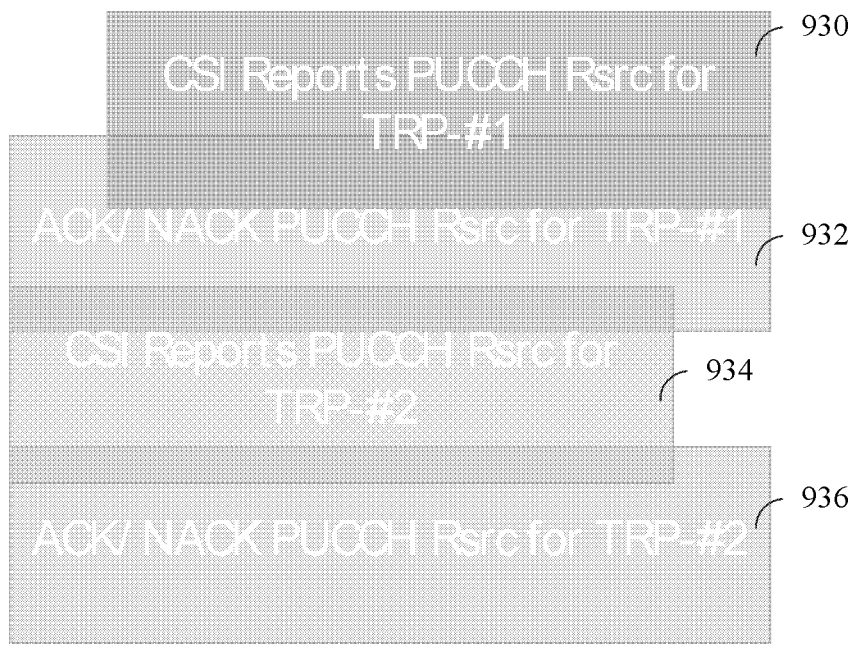
FIG. 9B is a diagram of example PUCCH resources configured for reporting CSI and HARQ feedback for the UE of FIG. 9A, in accordance with certain aspects of the present disclosure.

The UE 920 is also scheduled via downlink control signaling to use two PUCCH resources 932 and 936 for HARQ feedback as depicted in FIG. 9B. The UE 920 is also RRC configured to report TRP-specific CSI reports targeting TRPs 910A and 910B using two respective PUCCH resources 930 and 934 as shown in FIG. 9B. In this example, both the PUCCH resources 930, 934 for reporting CSI overlap with the PUCCH resources 932, 936 for reporting HARQ feedback as shown in FIG. 9B.

As an example, the UE 920 may multiplex the TRP-specific CSI reports targeting TRP 910A with the TRP-specific HARQ feedback also targeting TRP 910A using the PUCCH resource 932. If the payload size of the PUCCH resource 932 cannot support multiplexing all of the TRP-CSI reports targeting TRP 910A, the UE 920 rimy drop some of the CSI report(s) according to the priorities of the CSI. reports. The LIE 920 may transmit the combined UCI targeting TRP 910A using the PUCCH resource 932. A similar procedure may be implemented for the TRP-specific CSI reports and HARQ feedback targeting TRP 910B using the PUCCH resource 936.

In accordance with certain aspects, where the PUCCH resources for CSI reports overlap with PUCCH resources for HARQ feedback targeting different TRPs, the UE may also apply various multiplexing rules for the CSI reports. For certain aspects, the UE may assume that reporting the HARQ feedback takes priority over reporting the CSI targeting a different TRP than the HARQ feedback. The UE may drop the CSI reports targeting the different TRP from being multiplexed with the PUCCH resources configured for the HARQ feedback.

In other aspects, the UE may multiplex the CSI reports over the PUCCH resources scheduled for HARQ feedback targeting the different TRP and tolerate the non-ideal backhaul delay for the CSI reports. For instance, the UE may multiplex the CSI reports with the PUCCH resources for HARQ feedback in the order of the TRP-indexes and transmit the combined UCI towards TRP(s) not associated with the CSI reports, which may result in a reception delay at the TRP. The PUCCH resources associated with the HARQ feedback used to multiplex the CSI reports may include any of the PUCCH resources configured for HARQ feedback, such as PUCCH resources for reporting HARQ feedback that overlap or do not overlap with the PUCCH resources for reporting CSL As an example, the UE may determine that a portion of the second set of PUCCH resources configured for reporting HARQ feedback overlaps with a portion of the first set of PUCCH resources configured for reporting CSI and that the downlink DMRS port group associated with the portion of the first set of PUCCH resources is different from the downlink DMRS port group associated with the overlapping portion of the second set of PUCCH resources. The UE may transmit the CSI reports and the HARQ feedback by multiplexing the CSI reports using the PUCCH resources associated with the HARQ feedback based on the determination of the overlapping portions.

In certain aspects, multiplexing the CSI reports using the PUCCH resources associated with the HARQ feedback may include dropping the CSI reports associated with the portion of the first set of PUCCH resources from being multiplexed with the portion of the second set of PUCCH resources used for reporting the HARQ feedback. In other aspects, multiplexing the CSI reports using the PUCCH resources associated with the HARQ feedback may include multiplexing the CSI reports associated with the portion of the first set of PUCCH resources using the multiplexing portions of the second set of PUCCH resources associated with the HARQ feedback based on priority levels of the CSI reports. The CSI reports may be multiplexed within a maximum number of CSI reports, and the maximum number of CSI reports to be multiplexed may be based on the allowed payload size of the multiplexing portions of the PUCCH resources schedule for the HARQ feedback for UCI transmission. In certain aspects, the multiplexing portions may include the overlapping portion of the second set of PUCCH resources and at least one determined additional portion of the second set of PUCCH resources associated with the same downlink DMRS port group as the overlapping portion of the second set of PUCCH resources. The at least one additional portion of the second set of PUCCH resources associated may not overlap with the respective portion of the first set of PUCCH resources. If the UE determines that there is an additional portion of the second set of PUCCH resources that does not overlap and targets the same TRP as the overlapping portions, the UE may use the determined additional portion of the second set of PUCCH resources for multiplexing the CSI reports.

For certain aspects, the BS may be aware of the multiplexing performed at the UE, as described herein, where the PUCCH resources for CSI reports overlap with PUCCH resources for HARQ feedback targeting different TRPs. The BS may determine that a portion of the second set of PUCCH resources configured for reporting HARQ feedback overlaps with a portion of the first set of PUCCH resources configured for reporting CSI, and that the downlink DMRS port group associated with the portion of the first set of PUCCH resources is different from the downlink DMRS port group associated with the overlapping portion of the second set of PUCCH resources.

The BS may receive the UCI by demultiplexing CSI reports using the PUCCH resources associated with the HARQ feedback based on the determination of the overlapping portions. In certain aspects, the BS may identify that the CSI reports associated with the portion of the first set of PUCCH resources are dropped from being multiplexed with the portion of the second set of PUCCH resources. In other aspects, the BS demultiplex the CSI reports associated with the portion of the first set of PUCCH resources using the multiplexing portions of the second set of PUCCH resources associated with the HARQ feedback based on priority levels of the CSI reports.

The BS may demultiplex the CSI reports over the PUCCH resources scheduled for HARQ feedback targeting a different TRP. For instance, the BS may assume the CSI reports multiplexed with the PUCCH resources for HARQ feedback are in the order of the TRP-indexes and the combined UCI is transmitted by the UE towards TRP(s) not associated with the CSI reports. In case the BS is the target for the HARQ feedback, the BS may identify the CSI reports addressed to the different TRP and drop the CSI reports. In case the BS is the target for the CSI reports, the BS may identify the HARQ feedback addressed to the different TRP and drop the HARQ feedback. The BS may also be aware of the reception delay for the CSI reports sent via PUCCH resources targeting a different TRP.

In accordance with certain aspects, where the PUCCH resources for CSI reports overlap with PUCCH resources for HARQ feedback targeting a different TRP and the same TRP, the UE may apply various multiplexing rules for the CSI reports. For certain aspects, if the PUCCH resources for HARQ feedback have other multiplexed CSI reports with the same target TRPs, as discussed herein, the UE may assume that such CSI reports take priority over the CSI reports associated with a different TRP. For instance, the UE may multiplex the CSI reports onto PUCCH resource with mismatched target TRPs, after multiplexing the CSI reports associated with the same TRP as the HARQ feedback, provided that PUCCH resource has enough payload size for the mismatched CSI reports. The PUCCH resources associated with the HARQ feedback used to multiplex the CSI reports may include any of the PUCCH resources configured for HARQ feedback that target the same TRP as the CSI reports, such as PUCCH resources for reporting HARQ feedback that overlap or do not overlap with the PUCCH resources for reporting CSI. The CSI reports may be multiplexed within a maximum number of CS1 reports, and the maximum number of CSI reports to be multiplexed may be based on the allowed payload size of the PUCCH resources scheduled for the HARQ feedback for UCI transmission.

As an example, the UE may determine that a portion of the second set of PUCCH resources configured for reporting HARQ feedback overlaps with a portion of the first set of PUCCH resources configured for reporting CSI and that the downlink DMRS port group associated with the portion of the first set of PUCCH resources is different from the downlink DMRS port group associated with the overlapping portion of the second set of PUCCH resources. The UE may also determine that the portion of the second set of PUCCH resources configured for reporting HARQ feedback overlaps with an additional portion of the first set of PUCCH resources configured for reporting CSI and that the additional portion of the first set of PUCCH resources is associated with a same downlink DMRS port group as the portion of the second PUCCH resources.

According to certain aspects, the UE may multiplex the CSI reports associated with the portion and the additional portion of the first set of PUCCH resources using the multiplexing portions of the second set of PUCCH resources associated with the HARQ feedback based on priority levels of the CSI reports. In certain aspects, the multiplexing portions comprises overlapping portion of the second set of PUCCH resources and at least one determined additional portion of the second set of PUCCH resources associated with the same downlink DMRS port group as the overlapping portion of the second set of PUCCH resources. The at least one additional portion of the second set of PUCCH resources associated may not overlap with the respective portion of the first set of PUCCH resources. The UE may assume the CSI reports associated with the additional portion of the first set of PUCCH resources have a higher priority than the CSI reports associated with the portion of the first set of PUCCH resources. The CSI reports assumed to have a higher priority (e.g., the CSI reports associated with the same TRP as the HARQ feedback) may be multiplexed before the CSI reports assumed to have a lower priority (e.g., the CSI reports associated with a different TRP as the HARQ feedback).

For certain aspects, the BS may be aware of the multiplexing performed at the UE, as described herein, where the PUCCH resources for CSI reports overlap with PUCCH resources for HARQ feedback targeting a different TRP and the same TRP. The BS may assume that the CSI reports targeting the same TRP as the HARQ feedback take priority over the CSI reports associated with a different TRP. For instance, the BS may demultiplex the UCI by identifying the CSI reports multiplexed on the PUCCH resources and the CSI reports dropped from being multiplexed based on the reporting priorities.

As an example, the BS may determine that the portion of the second set of PUCCH resources configured for reporting HARQ feedback overlaps with an additional portion of the first set of PUCCH resources configured for reporting CSI, and the additional portion of the first set of PUCCH resources is associated with a same downlink DMRS port group as the portion of the second PUCCH resources. The BS may demultiplex the CSI reports associated with the portion and the additional portion of the first set of PUCCH resources using the multiplexing portions of the second set of PUCCH resources associated with the HARQ feedback based on priority levels of the CSI reports as described herein.

Figure 10A:
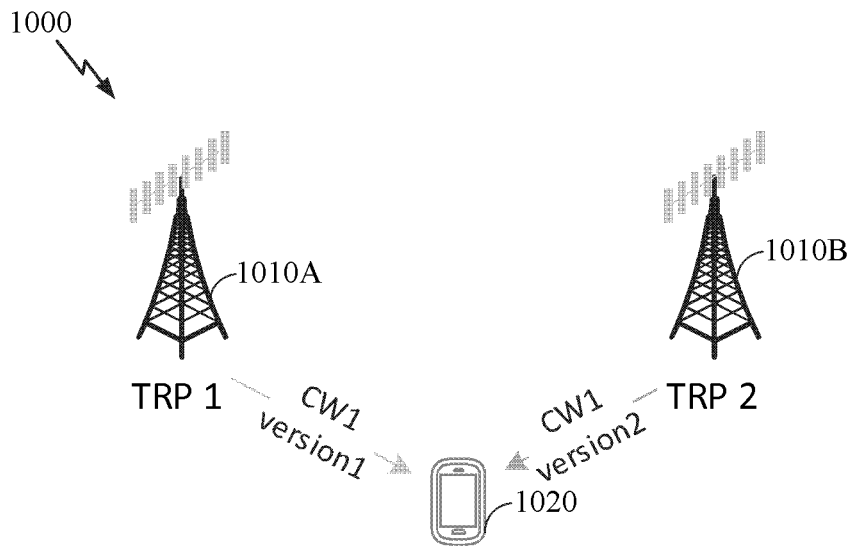
FIG. 10A is a diagram of an example multi-TRP wireless communication network where PUCCH resources for HARQ feedback overlap with PUCCH resources targeting the same TRP and a different TRP, in accordance with certain aspects of the present disclosure.

FIG. 10A illustrates an example multi-TRP wireless communication network 1000 where PUCCH resources for HARQ feedback overlap with PUCCH resources targeting the same TRP and a different TRP, in accordance with certain aspects of the present disclosure. As shown, the UE 1020 is connected to TRP 1010A and TRP 1010B using the same codeword. In this example, the UE 1020 may be configured to apply diversity enhancement based non-coherent joint transmissions. TRP 1010A or TRP 1010B transmits the same or different redundancy versions of the same codeword. The UE 1020 receives signals from the TRPs 1010A, 1010B and combines the decoding results (e.g., a log-likelihood ratio (LLR) based decoding) to enhance transmit diversity.

Figure 10B:
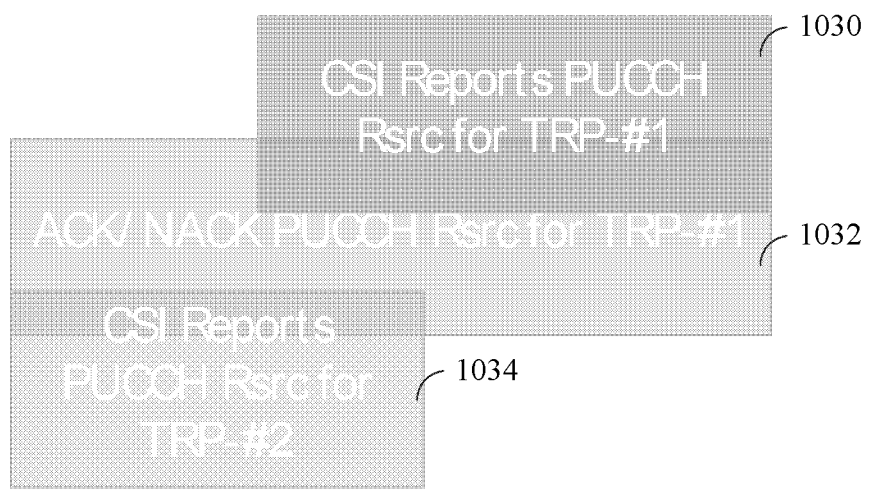
FIG. 10B is a diagram of example PUCCH resources configured for reporting CSI and HARQ feedback for the UE of FIG. 10A, in accordance with certain aspects of the present disclosure.

FIG. 10B is a diagram of example PUCCH resources assigned to UE 1020 and configured for reporting CSI and HARQ feedback, in accordance with certain aspects of the present disclosure. As shown, the UE 1020 is scheduled via downlink control signaling to use a PUCCH resource 1032 for HARQ feedback targeting TRP 1010A. The UE 1020 is also RRC configured to report TRP-specific CS1 reports targeting TRPS 1010A and 1010B using two respective PUCCH resources 1030 and 1034. In this example, the PUCCH resources 1030, 1034 for reporting CSI overlap with the PUCCH resource 1032 for reporting HARQ feedback.

In multiplexing, the UE may assume that the CSI reports associated with TRP 1010A take priority over the CSI reports associated with TRP 1010B. Suppose the remaining payload UCI has not reached the allowed size of the PUCCH resource 1032, the UE may multiplex the CSI reports for TRP 1010B onto the PUCCH resource 1032. If the remaining payload cannot support multiplexing the all of the CSI reports for TRP 1010B, some of the CSI reports for TRP 1010B may be dropped according to priority rules for CSI reports targeting TRP 1010B.

FIG. 11A illustrates an example multi-TRP wireless communication network 1100 where PUCCH resources for HARQ feedback overlap with PUCCH resources targeting the same TRP and a different and the TRPs transmit a part of the same codeword, in accordance with certain aspects of the present disclosure. As shown, the UE 1120 is connected to TRP 1110A and TRP 1110B using the same codeword.

FIG. 11B is a diagram of example PUCCH resources assigned to UE 1120 and configured for reporting CSI and HARQ feedback, in accordance with certain aspects of the present disclosure. As shown, the UE 1120 is scheduled via downlink control signaling to use a PUCCH resource 1132 for HARQ feedback targeting TRP 1110A. The UE 1120 is also RRC configured to report TRP-specific CSI reports targeting TRPs 1110A and 1110B using two respective PUCCH resources 1130 and 1134. In this example, the PUCCH resources 1130, 1134 for reporting CSI overlap with the PUCCH resource 1132 for reporting HARQ feedback. The UE 1120 may apply similar multiplexing rules as described herein with respect to FIGS. 10A and 10B.

In accordance with. certain aspects, the BS may transmit the configuration of the PUCCH resources for reporting CSI via at least one of radio resource control signaling or downlink control signaling. The BS may also transmit the indication via at least one of radio resource control signaling or downlink control signaling. The PUCCH resources associated with the configuration and the indication may overlap as described herein. The UE may obtain the configuration and indication of the overlapping PUCCH resources via at least one of radio resource control signaling or downlink control signaling.

FIG. 12 illustrates a communications device 1200 that may include various components (e.g., corresponding to means-plus-function components) configured to perform operations for the techniques disclosed herein, such as the operations illustrated in FIGS. 7 and 8. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable mediumimemory 1212 is configured to store instructions that when executed by processor 1204, cause the processor 1204 to perform the operations illustrated in FIGs, 7 and 8, or other operations for performing the various techniques discussed herein.

In certain aspects, the processing system 1202 may further include a transmiting/receiving component 1214 for performing the operations illustrated in FIGS. 7 and 8, or other aspects of the operations described herein. Additionally, the processing system 1202 may include a determining component 1216 for performing the operations illustrated in FIGS. 7 and 8, or other aspects of the operations described herein. Additionally, the processing system 1202 may include a generating component component 1218 for performing the operations illustrated in FIGS. 7 and 8, or other aspects of the operations described herein. Additionally, the processing system 1202 may include an obtaining component 1220 for performing the operations illustrated in FIGS. 7 and 8, or other aspects of the operations described herein. Additionally, the processing system 1202 may include a multiplexing/demultiplexing component 1222 for performing the operations illustrated in FIGS. 7 and 8, or other aspects of the operations described herein. Additionally, the processing system 1202 may include a dropping component 1224 for performing the operations illustrated in FIGS. 7 and 8, or other aspects of the operations described herein.

The transmitting/receiving component 1214, determining component 1216, generating component 1218, obtaining component 1220, multiplexing component 1222, and/or dropping component 1224 may be coupled to the processor 1204 via bus 1206. In certain aspects, the transmitting/receiving component 1214, determining component 1216, generating component 1218, obtaining component 1220, multiplexing/demultiplexing component 1222, and/or dropping component 1224 may be hardware circuits. In certain aspects, the transmitting/receiving component 1214, determining component 1216, generating component 1218, obtaining component 1220, multiplexing component 1222, and/or dropping component 1224 may be software components that are executed and run on processor 1204.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computin2, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one"

unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software compon.en.t(s) and/or module(s), including, but not limited to a circuit, an application specific integrated circuit (ASIC), or processor. Generally, where there are operations illustrated in figures, those operations may have corresponding counterpart means-plus-function components.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a. combination of a DSP and a microprocessor, a plurality of microprocessors, one or more microprocessors in conjunction with a DSP core, or any other such configuration.

If implemented in hardware, an example hardware configuration may comprise a processing system in a wireless node,. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium, For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
   determining that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with a plurality of downlink demodulation reference signal (DMRS) port groups;
   generating CSI reports and HARQ feedback associated with a same downlink DMRS port group of the plurality of downlink DMRS port groups; and
   transmitting the CSI reports and the HARQ feedback, multiplexed using the second set of PUCCH resources.

2. The method of claim 1, further comprising:
   obtaining a configuration for the first set of PUCCH resources for reporting CSI via at least one of radio resource control signaling or downlink control signaling; and
   obtaining an indication of the second set of PUCCH resources for reporting HARQ feedback via at least one of radio resource control signaling or downlink control signaling.

3. The method of claim 1, further comprising:
   determining that each portion of the first set of PUCCH resources configured for reporting CSI is associated with a same downlink DMRS port group as an overlapping portion of the second set of PUCCH resources configured for reporting HARQ feedback; and
   wherein transmitting comprises multiplexing the CSI reports for each portion of the first set of PUCCH resources using multiplexing portions of the second set of PUCCH resources configured for reporting the HARQ feedback.

4. The method of claim 3, wherein each portion of the first set of PUCCH resources includes one or more frequency-time resources configured as the PUCCH, and each overlapping portion of the second set of PUCCH resources includes one or more frequency-time resources configured as the PUCCH.

5. The method of claim 3, wherein multiplexing using the multiplexing portions of the second set of PUCCH resources configured for reporting the HARQ feedback comprises multiplexing the CSI reports for each portion of the first set of PUCCH resources using the overlapping portion of the second set of PUCCH resources and at least one determined additional portion of the second set of PUCCH resources associated with the same downlink DMRS port group as the overlapping portion of the second set of PUCCH resources.

6. The method of claim 3, wherein multiplexing comprises multiplexing the CSI reports for each portion of the first set of PUCCH resources using the multiplexing portions of the second set of PUCCH resources configured for reporting the HARQ feedback according to a priority level associated with the CSI reports.

7. The method of claim 6, wherein multiplexing comprises multiplexing the CSI reports associated with each portion of the first set of PUCCH resources with the HARQ feedback associated with the multiplexing portions of the second set of PUCCH resources within a maximum number of CSI reports to be multiplexed.

8. The method of claim 7, wherein the maximum number of CSI reports to be multiplexed is based on a payload size of the multiplexing portions of the second set of the PUCCH resources.

9. The method of claim 1, further comprising:
   determining that a portion of the second set of PUCCH resources configured for reporting HARQ feedback overlaps with each portion of the first set of PUCCH resources configured for reporting CSI and that the downlink DMRS port group associated with the portion of the first set of PUCCH resources is different from the downlink DMRS port group associated with the overlapping portion of the second set of PUCCH resources;
   wherein transmitting comprises multiplexing the CSI reports using the PUCCH resources associated with the HARQ feedback based on the determination of the overlapping portions.

10. The method of claim 9, wherein each portion of the first set of PUCCH resources includes one or more frequency-time resources configured as the PUCCH, and each portion of the second set of PUCCH resources includes one or more frequency-time resources configured as the PUCCH.

11. The method of claim 9, wherein multiplexing comprises dropping the CSI reports associated with the portion of the first set of PUCCH resources from being multiplexed with the portion of the second set of PUCCH resources used for reporting the HARQ feedback.

12. The method of claim 9, wherein multiplexing comprises multiplexing the CSI reports associated with the portion of the first set of PUCCH resources using multiplexing portions of the second set of PUCCH resources associated with the HARQ feedback based on priority levels of the CSI reports.

13. The method of claim 12, wherein multiplexing using the multiplexing portions of the second set of PUCCH resources configured for reporting the HARQ feedback comprises multiplexing the CSI reports for each portion of the first set of PUCCH resources using the overlapping portion of the second set of PUCCH resources and at least one determined additional portion of the second set of PUCCH resources associated with the same downlink DMRS port group as the overlapping portion of the second set of PUCCH resources.

14. The method of claim 13, wherein multiplexing comprises multiplexing the CSI reports associated with the portion of the first set of PUCCH resources with the HARQ feedback associated with the multiplexing portions of the second set of PUCCH resources within a maximum number of CSI reports to be multiplexed.

15. The method of claim 14, wherein the maximum number of CSI reports to be multiplexed is based on a payload size of the multiplexing portions of the second set of PUCCH resources.

16. The method of claim 9, further comprising:
determining that the portion of the second set of PUCCH resources configured for reporting HARQ feedback overlaps with an additional portion of the first set of PUCCH resources configured for reporting CSI and that the additional portion of the first set of PUCCH resources is associated with a same downlink DMRS port group as the portion of the second PUCCH resources;
wherein multiplexing comprises multiplexing the CSI reports associated with the portion and the additional portion of the first set of PUCCH resources using multiplexing portions of the second set of PUCCH resources associated with the HARQ feedback based on priority levels of the CSI reports, wherein the CSI reports associated with the additional portion of the first set of PUCCH resources have a higher priority than the CSI reports associated with the portion of the first set of PUCCH resources.

17. The method of claim 16, wherein multiplexing using the multiplexing portions of the second set of PUCCH resources configured for reporting the HARQ feedback comprises multiplexing the CSI reports associated with the portion and the additional portion of the first set of PUCCH resources using the overlapping portion of the second set of PUCCH resources and at least one determined additional portion of the second set of PUCCH resources associated with the same downlink DMRS port group as the overlapping portion of the second set of PUCCH resources.

18. The method of claim 16, wherein multiplexing comprises multiplexing the CSI reports associated with the portion and the additional portion of the first set of PUCCH resources with the HARQ feedback associated with the multiplexing portions of the second set of PUCCH resources within a maximum number of CSI reports to be multiplexed.

19. The method of claim 18, wherein the maximum number of CSI reports to be multiplexed is based on a payload size of the multiplexing portions of the second set of PUCCH resources.

20. The method of claim 1, wherein the downlink DMRS port groups are used for non-coherent joint transmissions.

21. A method of wireless communication by a base station (BS), comprising:
generating a configuration of a first set of physical uplink control channel (PUCCH) resources for reporting channel state information (CSI);
transmitting the configuration to at least one user equipment (UE);
generating an indication of a second set of PUCCH resources for reporting hybrid automatic repeat request (HARQ) feedback, wherein the first set of PUCCH resources configured for reporting CSI overlaps with the second set of PUCCH resources indicated for reporting HARQ feedback, wherein the first and second sets of PUCCH resources are associated with a plurality of downlink demodulation reference signal (DMRS) port groups;
transmitting the indication to the at least one UE; and
receiving, from the at least one UE, uplink control information (UCI), comprising CSI reports and HARQ feedback associated with a same downlink DMRS port group of the plurality of downlink DMRS port groups, multiplexed using the second set of PUCCH resources.

22. The method of claim 21, wherein;
transmitting the configuration comprises transmitting the configuration via at least one of radio resource control signaling or downlink control signaling; and
transmitting the indication comprises transmitting the indication via at least one of radio resource control signaling or downlink control signaling.

23. The method of claim 21, further comprising:
determining that each portion of the first set of PUCCH resources configured for reporting CSI is associated with a same downlink DMRS port group as an overlapping portion of the second set of PUCCH resources configured for reporting HARQ feedback; and
receiving the UCI comprises demultiplexing the CSI reports for each portion of the first set of PUCCH resources using multiplexing portions of the second set of PUCCH resources configured for reporting the HARQ feedback.

24. The method of claim 23, wherein each portion of the first set of PUCCH resources includes one or more frequency-time resources configured as the PUCCH, and each overlapping portion of the second set of PUCCH resources includes one or more frequency-time resources configured as the PUCCH.

25. The method of claim 23, wherein demultiplexing using the multiplexing portions of the second set of PUCCH resources configured for reporting the HARQ feedback comprises demultiplexing the CSI reports for each portion of the first set of PUCCH resources using the overlapping portion of the second set of PUCCH resources and at least one determined additional portion of the second set of PUCCH resources associated with the same downlink DMRS port group as the overlapping portion of the second set of PUCCH resources.

26. The method of claim 23, wherein demultiplexing comprises demultiplexing the CSI reports for each portion of the first set of PUCCH resources using multiplexing portions of the second set of PUCCH resources configured for reporting the HARQ feedback according to a priority level associated with the CSI reports.

27. The method of claim 26, wherein demultiplexing comprises demultiplexing the CSI reports associated with each portion of the first set of PUCCH resources with the HARQ feedback associated with the multiplexing portions of the second set of PUCCH resources within a maximum number of CSI reports to be multiplexed.

28. The method of claim 27, wherein the maximum number of CSI reports to be multiplexed is based on a payload size of the multiplexing portions of the second set of the PUCCH resources.

29. The method of claim 21, further comprising:
determining that a portion of the second set of PUCCH resources configured for reporting HARQ feedback overlaps with a portion of the first set of PUCCH resources configured for reporting CSI, and that the downlink DMRS port group associated with the portion of the first set of PUCCH resources is different from the downlink DMRS port group associated with the overlapping portion of the second set of PUCCH resources;
receiving the UCI comprises demultiplexing the CSI reports using the PUCCH resources associated with the HARQ feedback based on the determination of the overlapping portions.

30. The method of claim 29, wherein the portion of the first set of PUCCH resources includes one or more frequency-time resources configured as the PUCCH, and the portion of the second set of PUCCH resources includes one or more frequency-time resources configured as the PUCCH.

31. The method of claim 29, wherein demultiplexing comprises identifying that the CSI reports associated with the portion of the first set of PUCCH resources are dropped from being multiplexed with the portion of the second set of PUCCH resources.

32. The method of claim 29, wherein demultiplexing comprises demultiplexing the CSI reports associated with the portion of the first set of PUCCH resources using multiplexing portions of the second set of PUCCH resources associated with the HARQ feedback based on priority levels of the CSI reports.

33. The method of claim 32, wherein demultiplexing using the multiplexing portions of the second set of PUCCH resources configured for reporting the HARQ feedback comprises demultiplexing the CSI reports for each portion of the first set of PUCCH resources using the overlapping portion of the second set of PUCCH resources and at least one determined additional portion of the second set of PUCCH resources associated with the same downlink DMRS port group as the overlapping portion of the second set of PUCCH resources.

34. The method of claim 33, wherein demultiplexing comprises demultiplexing the CSI reports using the multiplexing portions of the second set of PUCCH resources within a maximum number of CSI reports to be multiplexed.

35. The method of claim 34, wherein the maximum number of CSI reports to be multiplexed is based on a payload size of the multiplexing portions of the second set of PUCCH resources.

36. The method of claim 29, further comprising:
determining that the portion of the second set of PUCCH resources configured for reporting HARQ feedback overlaps with an additional portion of the first set of PUCCH resources configured for reporting CSI, and that the additional portion of the first set of PUCCH resources is associated with a same downlink DMRS port group as the portion of the second PUCCH resources;
wherein demultiplexing comprises demultiplexing the CSI reports associated with the portion and the additional portion of the first set of PUCCH resources using the multiplexing portions of the second set of PUCCH resources associated with the HARQ feedback based on priority levels of the CSI reports, wherein the CSI reports associated with the additional portion of the first set of PUCCH resources have a higher priority than the CSI reports associated with the portion of the first set of PUCCH resources.

37. The method of claim 36, wherein demultiplexing using the multiplexing portions of the second set of PUCCH resources configured for reporting the HARQ feedback comprises demultiplexing the CSI reports associated with the portion and the additional portion of the first set of PUCCH resources using the overlapping portion of the second set of PUCCH resources and at least one determined additional portion of the second set of PUCCH resources associated with the same downlink DMRS port group as the overlapping portion of the second set of PUCCH resources.

38. The method of claim 36, wherein demultiplexing comprises demultiplexing the CSI reports associated with the portion and the additional portion of the first set of PUCCH resources with the HARQ feedback associated with the multiplexing portions of the second set of PUCCH resources within a maximum number of CSI reports to be multiplexed.

39. The method of claim 38, wherein the maximum number of CSI reports to be multiplexed is based on a payload size of the multiplexing portions of the second set of PUCCH resources.

40. The method of claim 21, wherein the downlink DMRS port groups are used for non-coherent joint transmissions.

41. An apparatus for wireless communication, comprising:
one or more memories; and
at least one processor, coupled to the one or more memories, configured to cause the apparatus to:
determine that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with a plurality of downlink demodulation reference signal (DMRS) port groups, and
generate CSI reports and HARQ feedback associated with a same downlink DMRS port group of the plurality of downlink DMRS port groups; and
a transmitter configured to transmit the CSI reports and the HARQ feedback, multiplexed using the second set of PUCCH resources.

42. An apparatus for wireless communication, comprising:
one or more memories; and
at least one processor, coupled to the one or more memories, configured to cause the apparatus to:
generate a configuration of a first set of physical uplink control channel (PUCCH) resources for reporting channel state information (CSI), and
generate an indication of a second set of PUCCH resources for reporting hybrid automatic repeat request (HARQ) feedback, wherein the first set of PUCCH resources configured for reporting CSI overlaps with the second set of PUCCH resources indicated for reporting HARQ feedback, wherein the first and second sets of PUCCH resources are associated with a plurality of downlink demodulation reference signal (DMRS) port groups;
a transmitter configured to:
transmit the configuration to at least one user equipment (UE), and
transmit the indication to the at least one UE; and
a receiver configured to receive, from the at least one UE, uplink control information (UCI), comprising CSI reports and HARQ feedback associated with a same downlink DMRS port group of the plurality of downlink DMRS port groups, multiplexed using the second set of PUCCH resources.

43. An apparatus for wireless communication, comprising:
- means for determining that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with a plurality of downlink demodulation reference signal (DMRS) port groups;
- means for generating CSI reports and HARQ feedback associated with a same downlink DMRS port group of the plurality of downlink DMRS port groups; and
- means for transmitting the CSI reports and the HARQ feedback, multiplexed using the second set of PUCCH resources.

44. An apparatus for wireless communication, comprising:
- means for generating a configuration of a first set of physical uplink control channel (PUCCH) resources for reporting channel state information (CSI);
- means for transmitting the configuration to at least one user equipment (UE);
- means for generating an indication of a second set of PUCCH resources for reporting hybrid automatic repeat request (HARQ) feedback, wherein the first set of PUCCH resources configured for reporting CSI overlaps with the second set of PUCCH resources indicated for reporting HARQ feedback, wherein the first and second sets of PUCCH resources are associated with a plurality of downlink demodulation reference signal (DMRS) port groups;
- means for transmitting the indication to the at least one UE; and
- means for receiving, from the at least one UE, uplink control information (UCI), comprising CSI reports and HARQ feedback associated with a same downlink DMRS port group of the plurality of downlink DMRS port groups, multiplexed using the second set of PUCCH resources.

45. A non-transitory computer readable medium having instructions stored thereon for:
- determining that a first set of physical uplink control channel (PUCCH) resources configured for reporting channel state information (CSI) overlaps with a second set of PUCCH resources indicated for reporting hybrid automatic repeat request (HARQ) feedback, wherein the first and second sets of PUCCH resources are associated with a plurality of downlink demodulation reference signal (DMRS) port groups;
- generating CSI reports and HARQ feedback associated with a same downlink DMRS port group of the plurality of downlink DMRS port groups; and
- transmitting the CSI reports and the HARQ feedback, multiplexed using the second set of PUCCH resources.

46. A non-transitory computer readable medium having instructions stored thereon for:
- generating a configuration of a first set of physical uplink control channel (PUCCH) resources for reporting channel state information (CSI);
- transmitting the configuration to at least one user equipment (UE);
- generating an indication of a second set of PUCCH resources for reporting hybrid automatic repeat request (HARQ) feedback, wherein the first set of PUCCH resources configured for reporting CSI overlaps with the second set of PUCCH resources indicated for reporting HARQ feedback, wherein the first and second sets of PUCCH resources are associated with a plurality of downlink demodulation reference signal (DMRS) port groups;
- transmitting the indication to the at least one UE; and
- receiving, from the at least one UE, uplink control information (UCI), comprising CSI reports and HARQ feedback associated with a same downlink DMRS port group of the plurality of downlink DMRS port groups, multiplexed using the second set of PUCCH resources.

* * * * *